US012645203B2

(12) United States Patent
Bliefert

(10) Patent No.: US 12,645,203 B2
(45) Date of Patent: Jun. 2, 2026

(54) FIELD DEVICE AND METHOD FOR INTEGRATING A FIELD DEVICE

(71) Applicant: Phoenix Contact GmbH & Co. KG, Blomberg (DE)

(72) Inventor: Tim Bliefert, Hannover (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 542 days.

(21) Appl. No.: 18/005,617

(22) PCT Filed: Jul. 15, 2021

(86) PCT No.: PCT/EP2021/069791
§ 371 (c)(1),
(2) Date: Jan. 16, 2023

(87) PCT Pub. No.: WO2022/013371
PCT Pub. Date: Jan. 20, 2022

(65) Prior Publication Data
US 2023/0273591 A1 Aug. 31, 2023

(30) Foreign Application Priority Data
Jul. 17, 2020 (BE) .................................. 2020/5540

(51) Int. Cl.
*H04L 12/66* (2006.01)
*G05B 19/4155* (2006.01)

(52) U.S. Cl.
CPC .................... *G05B 19/4155* (2013.01); *G05B 2219/31229* (2013.01)

(58) Field of Classification Search
CPC ............ G05B 15/02; G05B 2219/2642; G05B 19/02; G05B 19/4185; G05B 19/042;
(Continued)

(56) References Cited

U.S. PATENT DOCUMENTS

| | | | |
|---|---|---|---|
| 6,370,448 B1* | 4/2002 | Eryurek | .............. G05B 19/4185 700/282 |
| 2002/0046263 A1* | 4/2002 | Camerini | .............. G05B 19/042 709/219 |

(Continued)

FOREIGN PATENT DOCUMENTS

| | | |
|---|---|---|
| DE | 102011078030 A1 | 12/2012 |
| DE | 102017108571 A1 | 10/2018 |

(Continued)

*Primary Examiner* — Kharye Pope
(74) *Attorney, Agent, or Firm* — LEYDIG, VOIT & MAYER, LTD.

(57) ABSTRACT

A method for integrating a field device into an automation system includes: configuring an application interface of a system controller of the automation system for communication with a data interface for the field device, the application interface being configured to send a request message (REQ message) in data packets, and to receive a response message (RES message) via a TCP connection, and during the configuring the data packets include an address field for the data interface of the field device specifying a first address referring to a server outside the automation system; and integrating the field device into the automation system by changing the address field in the data packets to a second address referring to the data interface of the field device within the automation system.

18 Claims, 3 Drawing Sheets

(58) Field of Classification Search
CPC .... G05B 2219/2639; G05B 2219/2625; G05B
2219/31162; G05B 2219/25198; G05B
2219/31093; Y04S 20/30; Y04S 40/128;
Y04S 20/244; Y04S 40/124; Y04S 40/18;
Y04S 40/121; H04L 12/2825; H04L
43/08; H04L 12/2818; H04L 9/3297;
F24F 11/58; F24F 11/30; Y02B 90/20;
Y02B 70/30; G06Q 50/06
See application file for complete search history.

(56) References Cited

U.S. PATENT DOCUMENTS

| | | | | |
|---|---|---|---|---|
| 2002/0082748 A1* | 6/2002 | Enga | ...................... | G01D 4/004 |
| | | | | 700/286 |
| 2004/0138787 A1* | 7/2004 | Ransom | ............. | G05B 19/4185 |
| | | | | 700/295 |

| | | | | |
|---|---|---|---|---|
| 2008/0235355 A1* | 9/2008 | Spanier | ................... | G06F 16/27 |
| | | | | 709/219 |
| 2011/0046801 A1* | 2/2011 | Imes | ......................... | G05F 1/66 |
| | | | | 700/286 |
| 2012/0095813 A1* | 4/2012 | Case | ...................... | G06Q 50/06 |
| | | | | 705/14.1 |
| 2012/0303170 A1* | 11/2012 | Tomita | ............. | H02J 13/00016 |
| | | | | 700/286 |
| 2013/0031201 A1* | 1/2013 | Kagan | ................... | G01D 4/004 |
| | | | | 709/213 |
| 2013/0204450 A1* | 8/2013 | Kagan | ................... | G01D 4/004 |
| | | | | 700/291 |
| 2014/0188933 A1 | 7/2014 | Chomik | | |
| 2018/0309653 A1 | 10/2018 | Johannsen et al. | | |

FOREIGN PATENT DOCUMENTS

| | | | |
|---|---|---|---|
| EP | 1594023 B1 | 11/2005 | |
| WO | WO 9919782 A1 | 4/1999 | |

* cited by examiner

300

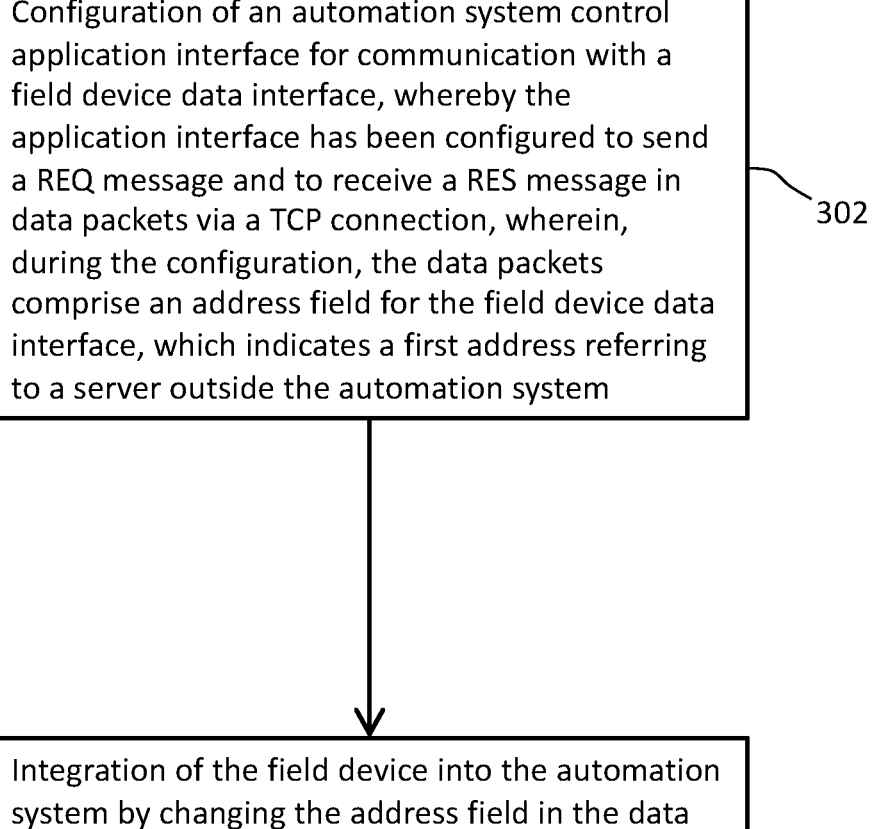

Configuration of an automation system control application interface for communication with a field device data interface, whereby the application interface has been configured to send a REQ message and to receive a RES message in data packets via a TCP connection, wherein, during the configuration, the data packets comprise an address field for the field device data interface, which indicates a first address referring to a server outside the automation system

302

Integration of the field device into the automation system by changing the address field in the data packets to a second address referring to the field device data interface within the automation system

FIELD DEVICE AND METHOD FOR INTEGRATING A FIELD DEVICE

CROSS-REFERENCE TO PRIOR APPLICATIONS

This application is a U.S. National Phase application under 35 U.S.C. § 371 of International Application No. PCT/EP2021/069791, filed on Jul. 15, 2021, and claims benefit to Belgian Patent Application No. BE 2020/5540, filed on Jul. 17, 2020. The International Application was published in German on Jan. 20, 2022 as WO/2022/013371 under PCT Article 21(2).

FIELD

The invention relates to a field device for an automation system and a method for the integration of such a field device into an automation system.

BACKGROUND

Field devices (technically also: field apparatuses) may comprise control elements (for example, actuators or valves) as well as sensors (for example, measurement converter). In factory and process automation, the field devices are equipped with a system controller (technically also: control system, for example a process control system with a process controller) are networked via a field bus or real-time Ethernet. The data from a sensor may be collected at set intervals and passed on for process control.

The system controller evaluates the data for further processing and for controlling or regulating the field devices. This may also include visualisation and display of a result of the evaluation, for example pressure, flow and temperature of a fluid, and whether a valve is open or closed. For example, the system controller may display analysis and alarm data on system panels based on the data.

In the prior art, a process control system assumes the function of a master that queries sensors as slaves. The master controls the slave, which is connected to and communicates with the master via a bus system, and processes the data received from the slave. For this purpose, the master also detects the slave via the bus system in order to then automatically generates a device configuration, which may be used to set up the slave according to its identifiers, so that the slave is ready for operation in the process control system. Document EP 1 594 023 B1 describes such a method for the automatic configuration of the process control system.

However, such a conventional configuration method requires that drivers and configurations for a variety of different field device identifiers are already stored in the process control system. This approach may be inefficient given the variety of different existing process control systems combined with the variety of potential field devices.

Another conventional approach to integrating a field device into an existing automation system is obtaining a copy of the field device. The copy may then be used to start the development of a driver specific to the combination of field device and system controller that enables data communication between field device and system controller. However, in the course of the development of the driver, it may turn out that the field device correctly selected in its function as an actuator or sensor is unsuitable for data communication with the control system for the automation system, making it necessary for this approach to be repeated for another field device with no certainty of success.

SUMMARY

In an embodiment, the present invention provides a method for integrating a field device into an automation system, comprising: configuring an application interface of a system controller of the automation system for communication with a data interface for the field device, the application interface being configured to send a request message (REQ message) in data packets, and to receive a response message (RES message) via a TCP connection, and during the configuring the data packets comprise an address field for the data interface of the field device specifying a first address referring to a server outside the automation system; and integrating the field device into the automation system by changing the address field in the data packets to a second address referring to the data interface of the field device within the automation system.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIG. 3 shows a schematic flow diagram of a process for integrating a field device into an automation system.

DETAILED DESCRIPTION

Figure 1:
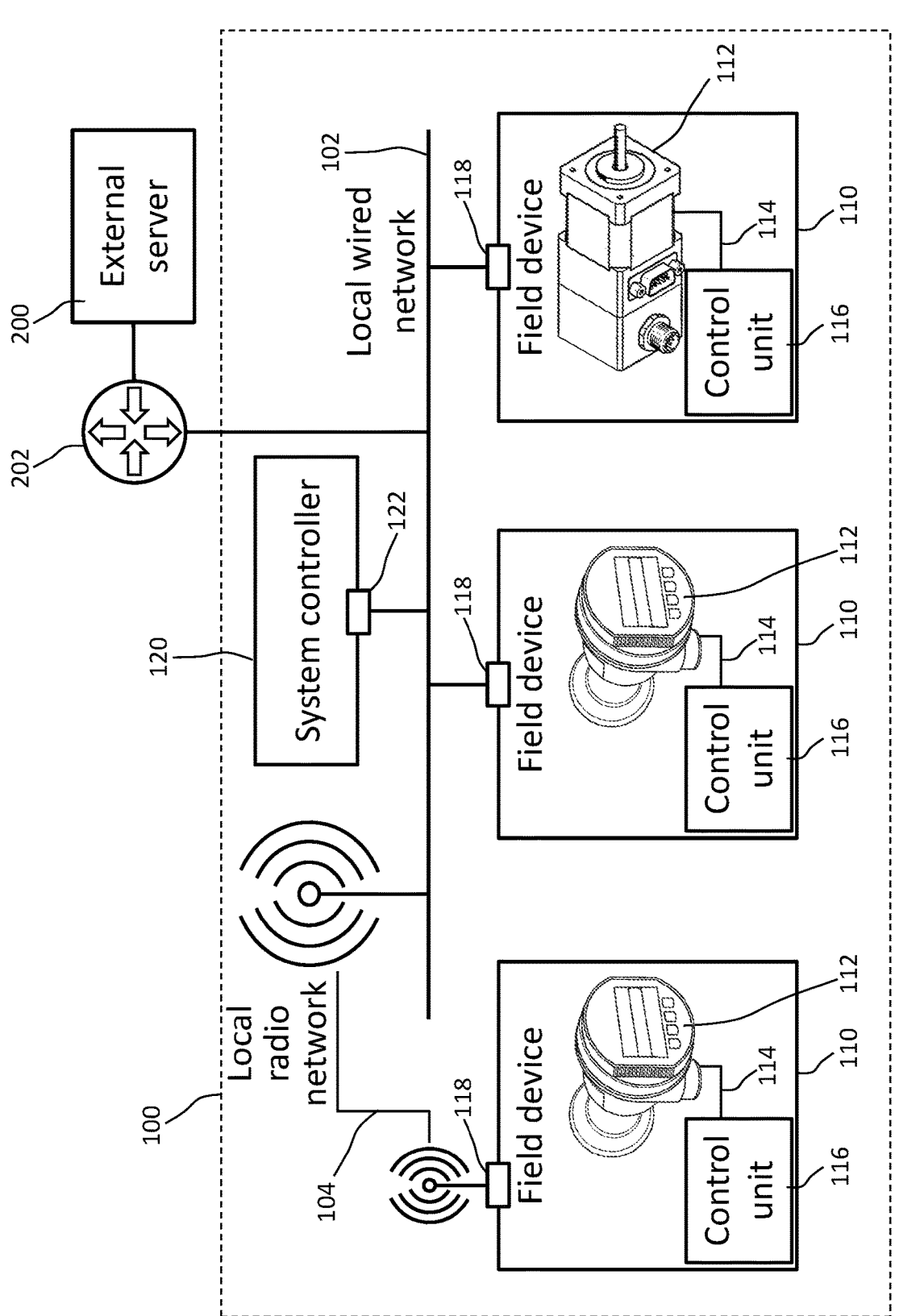
FIG. 1 shows a schematic block diagram of an automation system with field devices according to a first exemplary embodiment.

In an embodiment, the present invention provides a field device that can be reliably and efficiently integrated into a variety of different automation systems.

Exemplary embodiments of the invention are described below with partial reference to the figures.

According to a first aspect, a field device of an automation system comprises at least one actuator and/or at least one sensor (in short: an actuator and/or sensor). Furthermore, the field device comprises a control unit in data connection with the actuator and/or sensor. The control unit is configured to acquire and/or output data from the actuator and/or sensor via the data connection. Furthermore, the field device comprises a data interface which is configured to exchange data packets between the control unit and a system controller of the automation system. The control unit is further configured to establish a TCP connection with the system controller via the data interface according to a transmission control protocol (TCP), and to receive a request message (REQ message) about the data of the actuator and/or sensor and to send a response message (RES message) about the data to the system control via the TCP connection according to a hypertext transmission protocol (HTTP).

Exemplary embodiments of the field device may be integrable into the automation system by means of the HTTP-compliant REQ and RES messages about the data, preferably without the development of field device-specific drivers for the system controller of the automation system and/or without field device-specific configuration of the system controller of the automation system.

Exemplary embodiments of the field device may communicate with the system controller of the automation system by means of the HTTP-compliant REQ and RES messages without the development of field device-specific drivers and/or without a field device-specific configuration. Preferably, the field device control unit is configured to receive the data in the REQ message, to output it to the actuator via the data connection and to send an acknowledgement of the output of the data in the RES message and/or feedback of an operation (for example, movement) of the actuator in response to the output. Alternatively or in addition, the field device control unit is configured to receive an instruction in the REQ message to acquire the data, to acquire the data from the sensor via the data connection, and to send the acquired data in the RES message to the control system.

The field device, preferably the control unit, may act as server within the TCP connection. Alternatively or additionally, the system controller may act as client within the TCP connection.

The field device may also be referred to as a field instrument. The field device may be an industrial electronic device.

The field device may be configured for integration in a manufacturing plant or process plant. The field device may comprise actuators (for example, control elements, valves, etc.) and/or sensors (for example, transmitters), preferably in a manufacturing or process automation system.

In order to establish the TCP connection with the system control via the data interface according to the TCP, the control unit may be configured to receive a synchronisation packet (SYN packet) from the system controller, via the data interface according to the TCP, in order to establish the TCP connection with the system controller, and to send an acknowledgement (SYN-ACK) of the receipt of the SYN packet to the system controller.

The control unit in data connection with the actuator and/or sensor may be configured to process the data (for example, data acquired, output or to be output) of the actuator and/or sensor. Alternatively or additionally, the control unit may be configured to receive the data (for example, data collected or output or to be output) of the actuator and/or sensor in the data packets from the system controller, and/or to send (i.e. transmit) the data in the data packets to the system controller.

The data interface may be configured to exchange the data of the actuator and/or sensor between the control unit and the system controller of the automation system.

The system controller may be a control centre of the automation system or a process control system of the automation system. Alternatively or additionally, the system controller may be a programmable logic controller (PLC) and/or a virtual machine (VM) with (for example, local application). The application may be configured for the development and/or for the operation of energy generation units and/or consumption units. The field device may be part of such a generation unit or consumption unit.

The automation system may be a manufacturing plant or a process plant.

Exemplary embodiments of the field device may use the control unit as a server, in particular as REST server, to flexibly provide the data to the system controller using HTTP as its language. Thus, a client may be adapted or developed to make it easier for the system controller to receive or (for example, asynchronously) record the data.

Alternatively or additionally, the control unit may provide a stateless (for example, a "REpresentational State Transfer" or REST-compliant) interface to the system controller via the TCP connection by means of the messages according to HTTP.

The same or further exemplary embodiments of the field device may enable a client to be adapted or developed to make it easier for the system controller to receive or (for example, asynchronously) record the data, before the field device is integrated into the automation system or connected to the system controller of the automation system via the data interface, preferably before the field device is obtained for the automation system. For example, the adaptation or development of a client for the system controller may be started or executed by accessing a corresponding control unit (for example, of the manufacturer of the field device), via the TCP connection. In order to integrate the field device, it may then be sufficient to adapt an internet protocol (IP) address of the field device in the client.

The REQ message may include a request for the data. The RES message may include the requested data.

The REQ message may specify a time period. The RES message may comprise the data collected by the actuator and/or sensor, or data output to the actuator and/or sensor during the specified time period.

Timestamps may be assigned to the data. The timestamps may each indicate the time that the data was acquired and/or output. For example, the RES message may include the data to which timestamps are assigned during the specified time period. Alternatively or additionally, the RES message may include the timestamps assigned to the data.

For example, the data may comprise a data series (for example, a measurement series) and the system controller may record the data series. Following a loss of communication between the control unit and the system controller (for example, an interruption of the exchange of the data packets and/or the TCP connection), using the specified time period, a gap in the recorded data series may be filled in a targeted manner or with minimal communication resources.

The REQ message may specify (i.e., be indicative of) a plain text. The RES message may comprise the data corresponding to the plain text.

The control unit may store the acquired and/or output data. The control unit may be configured to scan the acquired, output or stored data using the plain text specified by the REQ message. The data may correspond to the plain text specified in the REQ message if the data is assigned a key term (for example, a keyword) that is included in the plain text.

Alternatively or additionally, plain texts may be assigned to the data, which describe the data in each respective case. For example, the RES message may include the plain texts assigned to the data.

As well as raw data for the actuator and/or sensor, the data may also include a description (for example, the description of a measurement point). Exemplary embodiments of the device may enable the system controller to display an instrument panel (technically also: "dashboard" or panel) due to the communication with the control unit.

The data may be used to configure the system controller for the evaluation and/or visualisation and/or display of the data (for example, a results of the evaluation). For example, the data may include measured values and an associated physical unit to display a pressure, a flow (preferably a flow rate) and/or a temperature of a fluid. Alternatively or additionally, the data may comprise a symbol to display the measured value or the operating state (e.g. valve open or closed).

The plain text specified by the REQ message and/or the plain text, respectively, assigned to the data may include a key term or a block of text to describe the data.

For example, the RES message may comprise the data whose plain texts contain the plain text specified in the REQ message (e.g. in full or at least one key term). Alternatively or additionally, the RES message may include the plain texts assigned to the data.

The data may comprise at least two different time series. The assigned plain text may specify the respective time series. Alternatively or additionally, the data may comprise at least two different measured values. The assigned plain text may specify the respective measured value.

Optionally, the RES message may include a reference to a previous RES message wherein the previous RES message comprises the plain texts assigned to the data. A repetition of the same plain texts in different or successive RES messages may be omitted, for example for more efficient use of communication resources.

The field device may comprise at least two different actuators and/or sensors in data communication with the control unit. The plain text assigned to the data may specify the respective actuator or sensor from which the data is acquired and/or to which the data is output or to be output.

The field device may be a measuring device (also: measuring instrument).

The plain text specified by the REQ message and/or the plain text respectively assigned to the data may comprise a description of a measurement point. Alternatively or additionally, the data may comprise at least one measured value and the assigned plain text may specify a physical unit of at least one measured value. Alternatively or additionally, the plain text may include an identifier for the field device and/or the actuator and/or the sensor.

The data may comprise measured values acquired by the sensor. Alternatively or additionally, the data may comprise control instructions to be output to the actuator. Alternatively or additionally, the data may comprise operating parameters acquired by the actuator and/or sensor and/or operating parameters output to the actuator and/or sensor. The control instructions and/or the operating parameters may determine an operating state of the actuator and/or sensor.

The data may also comprise timestamps. Alternatively or additionally, the respective timestamps may be assigned to one of the measured values and/or one of the control instructions and/or one of the operating parameters. For example, the assigned timestamp may indicate the time of acquiring of the measured values and/or of the output of the control instructions and/or of the acquiring and/or of the output of the operating parameters.

The measured values may include an electrical voltage and/or a frequency.

The RES message may include the data in an HTTP document. Alternatively or additionally, the RES message (for example, the HTTP document) may include the data according to a JavaScript Object Notation (JSON) or an Extensible Markup Language (XML) or as a Comma-Separated Value (CSV).

The data may be contained in the message body (technically also: body) of the RES message. Alternatively or additionally, a header (technically also "head") of the RES message may specify a firmware version of the field device, preferably a firmware version of the firmware executed by the control unit, and/or may comprise the reference to the previous RES message.

The data packets of the Internet protocol (IP data packets or IP packets for short) may comprise the REQ message and/or the RES message via the TCP connection.

The control unit may be a server for the TCP connection. Data communication for the control unit comprising the REQ message and the RES message via the TCP connection may be capable of being simulated by a server outside the automation system.

The control unit may also be configured to establish a TCP connection with a server outside the automation system via the data interface, and to receive a message according to the HTTP via the TCP connection with the server. The message from the server may include configuration of the field device. The server may be configured to select the configuration via the internet (for example as a web service). The server may be identical to or different from a server simulating the data communication with the control unit.

The control unit may also be configured to establish a TCP connection with a server outside the automation system via the data interface, and to send a message according to the HTTP via the TCP connection with the server. The message may indicate an operating state or an error state of the field device. The server may be identical to or different from a server simulating the data communication with the control unit and/or a server sending the configuration of the field device.

According to a second aspect, a method for integrating a field device into an automation system is provided. The field device may be a field device according to the first aspect. The method comprises a step of configuring or setting up (e.g., of adapting and/or of developing and/or testing) an application interface for the system controller of the automation system for communicating with the data interface of the field device. The application interface is configured to send the REQ message and to receive the RES message in the data packets via the TCP connection. The data packets comprise an address field for the field device or an address field for the data interface of the field device. When configuring or setting up, the address field specifies a first address that refers to a server outside the automation system. The process also comprises a step of integrating the field device into the automation system by changing the address field in the data packets to a second address that refers to the field device or the data interface of the field device within the automation system.

The server outside the automation system (also: external server) may comprise an instance or copy of the control unit of the field device. In the configuring or set-up step, a configuration of the system controller (preferably of the application interface) may be configured or set up (e.g., developed or adapted or tested) to communicate via the TCP connection with the data interface of the field device, preferably without obtaining a copy of the field device.

The instance or copy of the field device control unit may also be referred to as the digital twin of the field device. The instance or copy of the field device control unit may be accessed via the first address in the set-up step of the application interface for communicating the REQ and RES messages.

The first address may be a network address for the external server. Alternatively or additionally, the second address may be a network address for the field device installed in and/or connected to the automation system (for example, the address for the data interface of the field device). The respective first address and the second address may be IP addresses according to IPv4 or IPv6, for example.

The first address and the second address may be different from each other. The first address and the second address may differ from each other (preferably at least) in a section of the address field. The section may specify different subnets, for example according to a subnet mask or a prefix length of the section. The subnet specified by the first address may correspond to a subnet that comprises the external server. The subnet specified by the second address may correspond to a subnet that comprises the automation system and/or system controller.

Changing the address field for the data interface of the field device may include changing a destination address in the data packet (for example, in the data packet of the REQ message) and/or a sender address in the data packet (for example, in the data packet of the REQ message).

According to a third aspect, a system controller of the automation system is provided. The system controller may be configured to execute the method according to the second aspect. Alternatively or additionally, the system controller may comprise an application interface. The application interface of the system controller may be configured to communicate with the data interface of a field device according to the first aspect. Alternatively or additionally, the application interface of the system controller may be configured to send, preferably in data packets of a TCP connection, an REQ message according to a hypertext transfer protocol (HTTP), preferably the REQ message according to the first or second aspect, and to receive an RES message according to the HTTP, preferably the RES message according to the first or second aspect.

In any aspect, an address field in the data packets, for example for a network address of the field device or the data interface of the field device, may optionally or selectively:

specify the first address or refer to the server outside the automation system (preferably for configuring or setting up the application interface of the system controller); and specify the second address or refer to the field device within the automation system (preferably for integration of the field device).

The method according to the second aspect and/or the system control according to the third aspect may each comprise any step and/or any feature disclosed in the context of the first aspect, or a corresponding step or a corresponding feature.

FIG. 1 shows a schematic block diagram of an example automation system 100 with first exemplary embodiments of a field device generally referred to with reference numeral 110. The field device 110 may be an industrial electronic device, for example a measuring instrument.

The automation system 100 comprises at least one exemplary embodiment for the field device 110 that is read (i.e., monitored) and/or controlled (i.e., regulated) by a system controller 120 of the automation system 100. While one system controller 120 is shown in FIG. 1, multiple system controllers 120 may be configured to be redundant or hierarchical for reading and/or controlling the field device 110 in the automation system 100.

The first respective exemplary embodiments of the field device 110 shown in FIG. 1 comprise an actuator 112 and/or sensor 112, as well as a control unit 116 in data communication 114 with the actuator 112 and/or sensor 112. The control unit 116 is configured to acquire and/or output data from the actuator 112 and/or sensor 112 via the data connection 114. Furthermore, the field device 110 comprises a data interface 118 configured to exchange data packets between the control unit 116 and the system controller 120 of the automation system 100.

The data interface 118 may comprise a network interface. For example, the data interface 118 may be configured for communication via a local wired network 102 (or a local power network 102). The local wire network 102 may comprise one or more conductor pairs for symmetrical signal transmission. Alternatively or additionally, the local wired network 102 may comprise at least one network switch (technically also: switch) that connects different branches of the conductor pairs for exchanging the data packets. The local wired network 102 may comprise an Ethernet, preferably according to a standard from the IEEE 802.3 series and/or a real-time Ethernet and/or single pair Ethernet (SPE).

Alternatively or additionally, the data interface 118 may be configured to communicate over a local radio network 104, e.g. a wireless local network (WLAN) according to the Wi-Fi Alliance or the IEEE 802.11 standards series, or a cellular network according to radio access technology of the Third Generation Partnership Project (3GPP), preferably according to fifth generation radio access technology (technically also: Fifth Generation New Radio or 5G NR). For this purpose, the data interface 118 may comprise a baseband chip configured to send or receive the data packets by means of a protocol stack according to the radio access technology. For example, the data interface 118 may be configured for extremely reliable and low-latency communication (technically: Ultra-Reliable Low-Latency Communication or URLLC) according to standards document 3GPP TR 38.824 V16.0.0 and/or standards document 3GPP TR 33.825 V16.0.1.

The wired network 102 and/or the radio network 104 may form the subnetwork (e.g., a campus network) for the automation system 100. The integrated field device 110 and the system controller 120 are connected in the same subnet.

The control unit 116 is further configured to establish a TCP connection with the system controller 120 via the data interface 118 according to a transmission control protocol (TCP), and to receive a request message (REQ message) regarding the actuator and/or sensor data, and to send a response message (RES message) regarding the data to the system controller 120 via the TCP connection according to a hypertext transmission protocol (HTTP).

In a first variant of each exemplary embodiment, as shown schematically in FIG. 1, for example, the control unit 116 and the data interface 118 are arranged outside the sensor 112 or actuator 112, respectively. In a second variant of each exemplary embodiment, the control unit 116 and/or the data interface 118 is integrated into the sensor 112 and/or actuator 112. In a third variant of each exemplary embodiment, multiple sensors 112 and/or actuators 112 are connected to the control unit 116 via data connections 114.

In order to integrate the field device 110 (e.g. an industrial electronic device) into the automation system 100, the data exchange (i.e., the communication) is set up in the automation system 100 after the physical installation of the field device 110. The integration may, for example, be monitored or executed by a system integrator developer.

The field device 110 may be commissioned prior to the integration of the field device. Commissioning the field device 110 (e.g., the industrial electronic device) may include operating the field device 110 until it is ready to be commissioned, for example, until the field device 110 has been physically installed and/or connected and/or until the field device 110 has been set up to acquire the data by means of the sensor 112 and/or to output the data at the data interface 118. With its commissioning, the field device 110 shall be ready for integration into the automation system 100.

The automation system 100, e.g., the system controller 120, may be a system superimposed on the field device 110. Alternatively or additionally, the system controller 120 may be a programmable logic controller (PLC) and/or a virtual machine. Alternatively or additionally, the system controller 120 may comprise and/or execute a local application, and/or the system controller 120 may comprise and/or execute an application interface 122 development environment (for example, an API).

For example, the development environment may be a tool to test communication with the data interface 118 or a data interface of an external server 200 that is functionally identical to the data interface 118 and/or that outputs source code sections (also referred to in technical terms as "code snippets") for communication with the data interface 118. The source code sections may be used in the local application of the system controller 120.

Local application may comprise a control (preferably a regulation) of the field devices 110 that are networked to the system controller 120 via the application interface 122.

In the integration phase of the field device 110 (for example, an industrial electronic device), the communication between the field device 110 (for example, as a server for the TCP connection) and the system controller 120 (for example, as client for the TCP connection) is established and/or the system controller 120 (for example, the PLC or the local application) is configured to process the data and/or to check the data for plausibility, and/or to write plausible data into a database (for example, a database for the automation system 100 or an external database outside the automation system 100).

Conventional field devices comprise a Modbus server, for example. Traditionally, the drivers for communication between conventional field device and system control have to be developed during integration. In doing so, the developer looks into the Modbus server documentation and sorts values that are needed for the application. The driver is then implemented in a programming environment. Typically, this is done by first purchasing a copy of the conventional field device as a sample instrument, then commissioning it at the desk or in the automation system's network on site, and the development of the driver may then start.

In contrast, the first exemplary embodiment of the field device 110 comprises the control unit 116, which is capable of establishing a TCP connection with the system controller 120 without field device-specific drivers and is capable of exchanging messages regarding the data (e.g., instructions regarding the data or the data itself) according to the HTTP.

For example, the RES message may be closed (technically also: "self-contained"). In addition to the data, the RES message may also include additional information. The additional information may describe the data (preferably as plain text or text block) and/or comprise a configuration of the system controller 120 for processing or outputting the data.

In each exemplary embodiment, the system controller 120 may also be networked (i.e., connected to exchange data packets) with an external server 200 outside the automation system 100. The attributes "external" and "outside" may be synonymous here. The external server 200 may be outside the automation system 100 if a router 202 is arranged between the system controller 120 and the external server 200 to forward the data packets exchanged between the system controller 120 and the external server 200.

The external server 200 may provide the same functionality to the control unit 116 that the control unit 116 provides to the field device 110 via the data interface 118.

With the external server 200 providing the functionality of the control unit 116, the integration capability of the field device 110 may be ensured by establishing a TCP connection between the control unit 116 and the external server 200, and/or by exchanging the messages according to HTTP, preferably before obtaining a copy of the field device 110. Alternatively or additionally, the integration of the field device 110 may be prepared by the exchanging messages according to HTTP, preferably before obtaining a copy of the field device 110.

Figure 2:
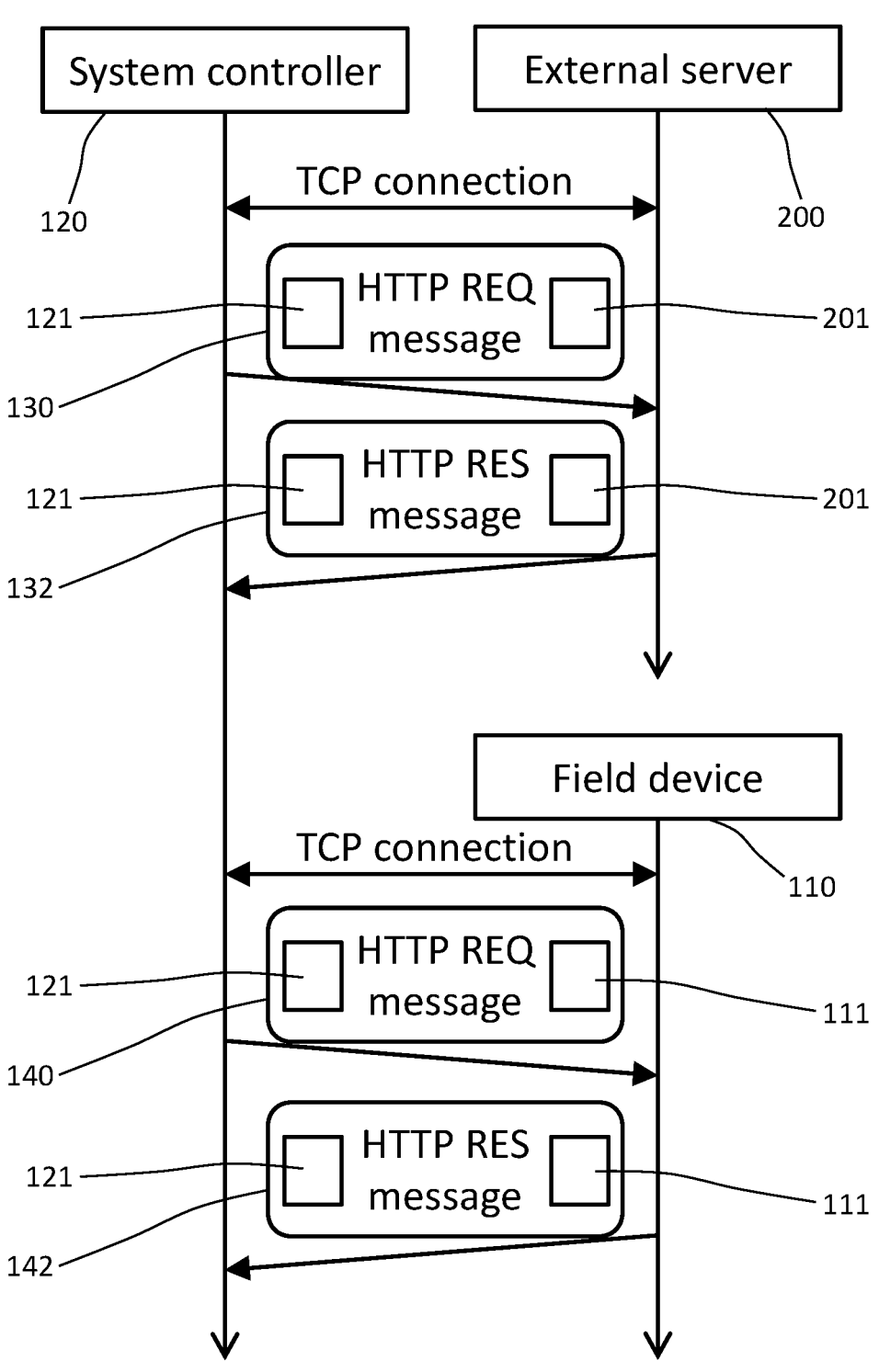
FIG. 2 shows a schematic communication diagram for integrating a field device into an automation system according to a second exemplary embodiment.

FIG. 2 shows, schematically, a communication diagram for integrating a field device 110 into an automation system 100 according to a second exemplary embodiment. While the following provides a clear and concise description of the interaction between the respective field device 110, the system controller 120 and the external server 200 according to the second exemplary embodiment, this disclosure does not require such an overall system. Rather, the functional features disclosed for the interaction are disclosed for the respective field device 110, the system controller 120, and the external server 200.

Furthermore, the field device 110, the system controller 120, and the external server 200 according to the second exemplary embodiment may each be a further development of the field device 110, the system controller 120, and the external server 200 according to the first exemplary embodiment.

The control unit 116 may act as server, for example regarding the TCP connection and/or the messages according to HTTP. Due to this feature of the field device 110, the second exemplary embodiment of the field device 110 enables the provision of a digital twin of the field device 110 outside the automation system, namely by means of an external server 200.

The external server 200 has a communication behaviour similar to the communication behaviour of the field device 110 via the data interface 118. In this respect, the external server 200 may be referred to as digital twin of the field device 110 or the control unit 116.

For example, the control unit 116 of the field device 110 comprises a memory and at least one processor that executes commands encoded in the memory of the field device 110, wherein a control module comprising the encoded commands is stored in the memory of the field device 110. For example, by executing the control module, the control unit 116 may output data to the actuator 112 via the data connection 114 based on the data packets received at the data interface 118, and/or send data acquired from the sensor 112 in data packets from the data interface 118 via the data connection 114.

For example, the external server 200 comprises a memory and at least one processor that executes commands encoded in the memory of the external server 200, wherein the memory of the external server 200 stores the same control module that is stored in the memory of the field device 110.

The external server 200 is preferably available via the Internet. The external server 200 is configured (for example, by virtue of the control module) to receive at least one message 130 from the system controller 120 (for example, a REQ message 130 corresponding to a subsequent REQ message 140 to the field device 110). The external server 200 is also configured (for example, by virtue of the control module) to offer a message 132 (e.g. a response, preferably an RES message 132 corresponding to the subsequent RES message 142 from the field device 110) via the Internet, preferably send it to the system controller 120, in response to the received message 130.

An application interface 122 for the system controller 120 may be set up for the field device 110 by means of the external server 200, preferably without having obtained a copy of the field device 110. For example, a developer may programme the system controller 120 as its client against the external Internet server 200 (as a digital twin). This enables the developer to prepare or execute the integration of the field device 110 into the automation system 100 without having a sample instrument of the field device 110 (for example, an industrial electronic device) on site.

Alternatively or additionally, the developer may begin analysis of the field device 110 (for example, industrial electronic device) without having a sample device of the field device 110 on site.

Each of the REQ and RES messages according to HTTP (preferably both) may be contained in a data packet (e.g. an IP data packet). The respective data packet comprises an address field for a sender address (technically also: "source address") and an address field for a destination address (technically also: "destination address").

For example, the address field of the sender address of the REQ message 130 may refer to the system controller 120, i.e. include the address 121 of the system controller 120. The address field of the destination address of the REQ message 130 may refer to the external server 200, i.e. include the address 201 of the external server 200 (also: the first address).

For example, the address field of the destination address of the RES message 132 may refer to the system controller 120, i.e., include the address 121 of the system controller 120. The address field of the sender address of the RES message 132 may refer to the external server 200, i.e., include the address 201 of the external server 200 (also: the first address).

Compared to the conventional procurement of a sample copy, the external server 200 helps to simply, shorten, or reduce the risks associated with an analysis process (e.g., a prototype analysis process) on the integration or the integration suitability of the field device 110.

After setting up the application interface 122 of the system controller 120 by means of the external server 200, only the first address needs to be replaced with the field device 110 address in order to integrate the field device 110 into the automation system 100.

For example, the address field of the sender address of the REQ message 140 may refer to the system controller 120, i.e., comprise the address 121 of the system controller 120. The address field of the destination address of the REQ message 140 may refer to the field device 110, i.e., comprise the address 111 of the field device 110 (also: the second address).

For example, the address field of the destination address of the RES message 142 may refer to the system controller 120, i.e., comprise the address 121 of the system controller 120. The address field of the sender address of the RES message 142 may refer to the field device 110, i.e., comprise the address 111 of the field device 110 (also: the second address).

Thus, once the system controller 120 has been set up by means of the external server 200, the integration may essentially include replacing the first address with the second address.

The data packets are preferably established according to the Internet Protocol (IP) (i.e., so-called IP data packets). The addresses are preferably IP addresses.

The second exemplary embodiment shown in FIG. 2 by means of the communication diagram may comprise a web service of the external server 200 for system integration without a sample of the field device 110.

For example, the control module executed by both the control unit 116 of the field device 110 and the external server 200 may comprise the function of a REST server for the field device 110 (for example, a complex measuring instrument).

Alternatively or additionally, the control module executed by the control unit 116 of the field device 110 may comprise the function of a REST server for the field device 110 (for example, for a complex measuring instrument). Based on the control module or the REST server of the field device 110, a REST server 200 may be developed on the Internet that provides exactly the same technical responses as the REST server for the field device 110. Thus, a virtual or digitised image of the field device 110 is available with respect to communication via the data interface 118.

In the step of setting up the system controller 120 (preferably the application interface 122), the developer may then develop a client that functions in communication with the REST server 200 on the Internet.

In the step of integrating the field device, the second address may be changed to the first address (for example, by changing a client network parameter). Thus, the integration 304 of the field device 110 is significantly accelerated compared to the conventional approach.

The technical solution for integrating the field device 110 into the automation system 100 (in short: system integration), for example, the data interface 118 for exchanging HTTP messages via a TCP connection, may also be applied to the configuration of the field device 110. The field device 110 (for example, an industrial electronic device) is configured by guiding the user through a web-based service provided by the external server 200 (or another external server) on the Internet, which leads to individual configuration of the field device 110. Guidance via web services increases convenience and reduces the time required to configure the field device 110.

Alternatively or additionally, the technical solution for system integration, for example the data interface 118 for exchanging HTTP messages via a TCP connection, may also be applied to the support and/or monitoring and/or remote maintenance of the field device 110. For example, the control unit 116 may be configured to send an operating state for the field device 110 to the external server 200 (preferably periodically or triggered by an error event). Alternatively or additionally, the field device (e.g. an industrial electronic device) may be supported by guiding the user through a web-based service for the external server 200 (or another external server) on the internet, leading, for example, to an initial diagnosis. Guidance via the web service leads to an increase in satisfaction with aftersales services or to the earlier resolution of the error status in order to prevent or shorten a downtime of the automation system 100.

FIG. 3 shows a schematic flow diagram of a process 300 for integrating a field device 110 into an automation system 100 according to a third exemplary embodiment. The field device 110, which has been integrated or is to be integrated thereby, may be configured according to the first and/or the second exemplary embodiment.

In a step 302, an application interface 122 of the system controller 120 for the automation system 100 is set up to communicate with the data interface 118 of the field device 110. The application interface 122 is set up to send the REQ message and receive the RES message in the data packets via the TCP connection, wherein during set-up 302 the data packets comprise an address field for the data interface of the field device 110 indicating a first address 201 referring to a server 200 outside the automation system 100. The process 300 further comprises a step 304 of integrating the field device 110 into the automation system 100 by changing the address field in the data packets to a second address 111 referring to the data interface of the field device 110 within the automation system 100.

As has become apparent from the above, exemplary embodiments of the field device 110 and of the process 300 may allow communication with the system controller 120— wherein the system controller 120 initially communicates with the external server 200—to already be established or verified prior to obtaining a copy of the field device 110. This communication of the system controller 120 with the external server 200 may essentially be the same as, or indistinguishable from, or equivalent to, the subsequent communication of the system controller 120 with the field device 110 (e.g., except for the address 111 in the address field for the field device 110). The integration of the field device 110 may essentially involve adjusting the address in the address field of the data packets from the address 201 of the external server 200 to the address 111 of the field device 110 in the automation system 100.

This enables a user of the system controller 120, for example a developer of the local application, to assess whether and/or how the field device 110 may be integrated into the automation system 100. For example, the user thereby acts in the role of a recommender or advisor who prepares or supports the decision to procure the field device 110 before a first copy of the field device 110 is procured. Compared to the conventional approach, this may save time and resources, for example in the transport and possible return transport of a sample copy.

For example, the developer may make an assessment as to whether the field device is suitable for integration and/or should be purchased at a later date and/or used in series production.

By configuring the control unit 116 of an exemplary embodiment of the field device 110 to communicate according to HTTP via the TCP connection, a (preferably subsequent) data communication between the system controller 120 and the field device 110 may be established (for example, reproduced, adapted, developed or verified) by an equivalent data communication between the system controller 120 and the external server 200. From the point of view of the system controller 120, the TCP connection may be equivalently established or executed and/or the REQ message sent and/or the RES message received during the data communication with the external server 200, as during data communication with the field device 110 integrated in the automation system 100, even if, for example, the TCP connection of the data communication with the external server 200 leads out of the subnet of the automation system via a router 202. Thus, the exemplary embodiments of the field device 110 or the process 300 for the integration of the field device 110 may greatly simplify a user's (e.g., the developer's) preparation for the decision to integrate and/or execute the integration of the field device 110.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

Automation system 100
Local wired network,
preferably 4-pair Ethernet or 1-pair Ethernet (SPE) 102
Local radio network,
preferably according to the fifth mobile radio generation 104
Field device, also field instrument (FG),
preferably industrial electronic device or measuring device 110
Network address, preferably IP address, of the field device 111
Actuator and/or sensor of the field device 112
Data connection between control unit and actuator and/or sensor 114
Field device control unit 116
Data interface between field device and system controller 118
System controller of the automation system 120
Network address, preferably IP address, of the system controller 121
Application interface of the system controller 122
REQ message during set-up 130
RES message during set-up 132
REQ message after integrating 140
RES message after integrating 142
External server outside the automation system 200
Network address, preferably IP address, of the external server 201
Gateway router between automation system and external server 202
Method of integrating a field device 300
Step of setting up an application interface 302
Step of integrating the field device 304
The invention claimed is:

1. A method for integrating a field device into an automation system, comprising:
configuring an application interface of a system controller of the automation system for communication with a data interface for the field device, the application interface being configured to send a request message (REQ message) in data packets, and to receive a response message (RES message) via a TCP connection, and during the configuring the data packets comprise an address field for the data interface of the field device specifying a first address referring to a server outside the automation system, the configuring comprising testing the communication with a data interface of an external service that is functionally identical to the data interface for the field device; and integrating the field device into the automation system by changing the address field in the data packets to a second address referring to the data interface of the field device within the automation system, wherein, by changing a network parameter of a client of the system controller, the first address is changed to the second address.

2. The method of claim 1, further comprising:

providing the field device of the automation system, the field device of the automation system comprising:

an actuator and/or sensor;

a control unit in data connection with the actuator and/or sensor and configured to acquire and/or output data of the actuator and/or sensor via the data connection; and the data interface, which is configured to exchange data packets between the control unit and the system controller of the automation system, wherein the control unit is configured to:

establish a transmission control protocol (TCP) connection with the system controller via the data interface of a TCP, and receive the REQ message about the data of the actuator and/or sensor and to send the RES message about the data to the system controller via the TCP connection of a hypertext transfer protocol (HTTP).

3. The method of claim 1, wherein the REQ message comprises a request for the data and the RES message comprises the requested data.

4. The method of claim 2, wherein the REQ message specifies a time period and the RES message comprises the data acquired by the actuator and/or sensor or data output to the actuator and/or sensor during the specified time period.

5. The method of claim 2, wherein timestamps are assigned to the data, each indicating a time that the data was acquired and/or output.

6. The method of claim 2, wherein the REQ message specifies a plain text, and the RES message comprises the data corresponding to the plain text.

7. The method of claim 2, wherein the data is assigned to plain texts each describing the data.

8. The method of claim 6, wherein the field device comprises at least two different actuators and/or sensors in data connection with the control unit, and the plain text associated to the data specifies a respective actuator or sensor from which the data is acquired and/or to which the data has been or is to be output.

9. The method of claim 6, wherein the plain text specified by the REQ message and/or the plain text respectively associated with the data comprises a description of a measurement point, and/or wherein the data comprises at least one measured value and the assigned plain text specifies a physical unit of the at least one measured value, and/or wherein the plain text comprises an identifier of the field device and/or of the actuator and/or of the sensor.

10. The method of claim 2, wherein the data comprises:

measured values acquired by the sensor; and/or control instructions to be output to the actuator; and/or operating parameters acquired by the actuator and/or sensor and/or output to the actuator and/or sensor, which determine an operating state of the actuator and/or sensor.

11. The method of claim 2, wherein the RES message comprises the data in an HTTP document or as a Comma-Separated Value (CSV).

12. The method of claim 2, wherein the REQ message and the RES message are included in the Internet Protocol (IP) data packets via the TCP connection.

13. The method of claim 2, wherein the control unit comprises a server for the TCP connection, and wherein a data communication of the control unit comprising the REQ message and the RES message via the TCP connection is simulatable by a server outside the automation system.

14. The method of claim 2, wherein the control unit is configured to establish a TCP connection with a server outside the automation system via the data interface and to receive a message of the HTTP via the TCP connection with the server, the message comprising a configuration of the field device from the server.

15. The method of claim 2, wherein the control unit is configured to establish a TCP connection with a server outside the automation system via the data interface and to send a message of the HTTP via the TCP connection with the server, the message specifying an operating state or error state of the field device.

16. A system controller of an automation system, wherein the system controller is configured to execute the method of claim 1.

17. The method of claim 7, wherein the RES message comprises the plain texts assigned to the data.

18. The method of claim 11, wherein the HTTP document comprises a JavaScript Object Notation (JSON) or an Extensible Markup Language (XML).

* * * * *